Dec. 11, 1951 G. A. TINNERMAN 2,578,381
SHEET METAL SNAP FASTENER
Filed March 17, 1948 2 SHEETS—SHEET 1
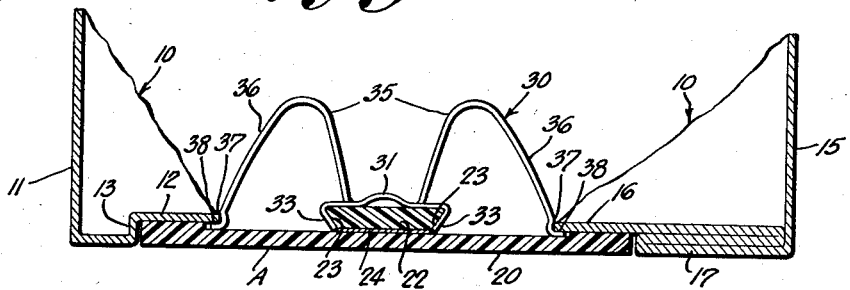
INVENTOR.
GEORGE A. TINNERMAN
BY
H. G. Lombard
ATTORNEY

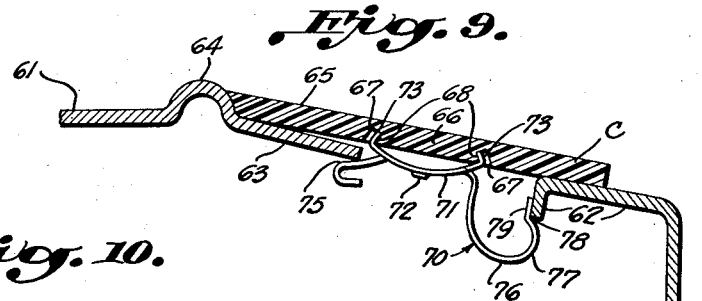

Patented Dec. 11, 1951

2,578,381

UNITED STATES PATENT OFFICE 2,578,381

SHEET METAL SNAP FASTENER

George A. Tinnerman, Cleveland, Ohio, assignor to Tinnerman Products, Inc., Cleveland, Ohio, a corporation of Ohio Application March 17, 1948, Serial No. 15,477

3 Claims. (Cl. 24—81)

This invention relates in general to cabinet constructions and the like and deals more particularly, with improvements in the mounting and attachment of various types of finishing objects in the form of elongate cover plates or trim strips commonly known as breaker strips, sealing strips, etc., in any such installation.

In the fabrication of refrigerator door structures, refrigerator casings and similar types of cabinet structures, it is usually necessary or desirable that a trim strip, breaker strip or other finishing object be secured in desired position in the completed structure by an operation taking place entirely from the outer or readily accessible side of the assembly inasmuch as the rearward or reverse side thereof seldom is conveniently or readily accessible for the application of fastening means for this purpose. The present invention contemplates in general the mounting and attachment of various types of trim strips, breaker strips, and the like in cabinet constructions and similar structures by the provision of attaching or connecting means on the body of the breaker strip or other finishing object for accommodating spring fastening means adapted for snap fastening engagement with flange portions of the cabinet structure in a manner whereby the mounting may be easily and quickly effected entirely from outside of the installation in a minimum of time and effort.

The breaker strips, trim strips, and similar finishing objects are usually relatively simple designs which may be most economically provided in the form of elongate plate-like articles of relatively thin cross-section and made of molded plastic materials in a simple molding operation or in the manner of simple sheet metal stampings, castings, or the like. The breaker strips or other finishing objects are advantageously provided in this manner in that there are no projecting parts thereon subject to breakage and the same otherwise may be compactly packaged to reduce the cost of shipping and handling to a minimum. When prepared for installation in an assembly, the breaker strips or other finishing objects are provided with connecting means for easy and quick attachment thereto of spring clip fastening devices designed for mounting the breaker strip in the assembly by substantial snap fastening action, as aforesaid, or otherwise adapted to provide the desired interlock between the finishing object and the supporting structure. Such connecting means may be provided in any suitable form or design in the manner of a connecting rib, flange, block or stud, or the like, either as an integral portion of the breaker strip or as a separate element secured to the underside thereof in any suitable way as by an adhesive, welding or other securing means for uniting the same to the breaker strip in a concealed joint in which such securing means is not visible on the outer or exposed surface of the breaker strip or other finishing object.

A primary object of the invention, therefore, is to provide various improved constructions for mounting a breaker strip, trim strip or other finishing object in a cabinet or casing structure or the like, such as described, comprising a finishing object having a relatively simple design in the form of a strip, plate or similar member which is prepared with integral connecting means or otherwise provided with separate connecting means for the attachment of spring clip fastening devices for securing the breaker strip in an assembly by an operation taking place entirely from outside the assembly.

A further object of the invention is to provide various installations of this character comprising improved forms of spring fasteners which are designed for use in accordance with the nature of the installation and the formation and design of the breaker strip and the supporting structure on which he breaker strip is mounted.

Another object of the invention is to provide various improved installations of the kind referred to which are admirably suited for the mounting of a breaker strip or other finishing object of relatively wide cross-section by spring clip fasteners of relatively smaller size.

An additional object of the invention is to provide various installations such as described in which the spring fasteners are designed for easy and quick attachment to the breaker strip or other finishing object in the manner of simple clip devices and are otherwise adapted for snap fastening engagement with the adjacent flange structure of the cabinet, casing or other supporting part on which the breaker strip is mounted.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a sectional view representing a construction such as employed in the fabrication of the walls or door of a refrigerator, for example, which comprises spaced panels or liners and a breaker strip or sealing strip or the like mounted in position for closing and covering the space at the ends of said panels or liners;

Fig. 2 is a fragmentary perspective view of the installation shown in Fig. 1;

Fig. 3 is a top plan view of the fastener shown employed in Figs. 1 and 2;

Fig. 4 is a side or edge elevational view of the fastened per se; and,

Fig. 5 is an end view of the fastener shown in Figs. 3 and 4.

Fig. 6 is a sectional view similar to Fig. 1 of another installation with the fastener employed shown in side or edge elevation;

Fig. 7 is a plan view of a fragment of the breaker strip illustrated in Fig. 6 and showing in top plan the fastener as attached thereto; and, Fig. 8 is a sectional view of Fig. 6, as seen along line 8—8, looking in the direction of the arrows, and showing in bottom plan the fastener as attached to the connecting portion of the breaker strip.

Fig. 9 is a sectional view similar to Fig. 1 showing another type of installation in accordance with the invention;

Fig. 10 is an enlarged side or edge elevational view of the fastener shown employed in Fig. 9; and, Fig. 11 is a bottom plan view of the fastener per se shown in Fig. 10.

Fig. 12 is a sectional view similar to Fig. 1 of a further installation in accordance with the invention;

Fig. 13 is a side or end view of the fastener shown in Fig. 12;

Fig. 14 is a top plan view of the fastener per se; and,

Fig. 15 is a side or edge elevational view of the fastener shown in Figs. 12–14 inclusive.

The various attaching means of the invention are particularly suited for a wide range and variety of applications and uses for mounting or securing an object or part on a supporting structure by concealed fasteners. The various attaching means of the invention, accordingly, comprise fasteners of general utility which are highly advantageous in that they involve only inexpensive, one-piece sheet metal attaching clips and otherwise eliminate the need for bolts, screws, nuts and similar fasteners which require time consuming assembling operations. A further advantage in the use of any form of the improved attaching means resides in the fact that an assembly may be completely installed in applied mounted position on a supporting structure from the outer or readily accessible side without need for access to the inner or rearward side of the installation as is required in the use of the usual nut and bolt type of fasteners. For purposes of illustration, the various forms of the invention are disclosed in connection with installations for cabinet and casing structures such as employed in refrigerators and the like, but it is to be understood that the improved attaching means in any of the forms shown are not limited to the types of installations herein illustrated and described, but rather are equally adaptable to various other similar and related types of assemblies.

Referring now, more particularly, to the drawings, Fig. 1 illustrates by way of example, a general construction of the walls surrounding the storage space of a refrigerator cabinet, including the usual hinged door forming one of such walls. Such a wall construction, designated generally 10, comprises spaced inner and outer wall panels or liners 11, 15, respectively, having the space therebetween filled with a suitable heat insulating material. The inner wall member 11 is provided with a flange 12 extending inwardly toward the outer wall member, preferably on an offset or countersunk marginal portion 13. The outer wall member 15 comprises a similar panel terminating in an inwardly extending flange 16 in offset relation or countersunk relation defined by a folded portion 17 which also serves in the manner of a beading to strengthen and rigidify said panel member 15. The inwardly extending flanges 12 and 16, accordingly, form the end of the wall defined by the spaced wall panels 11 and 15. The insulating area or space between said flanges 12 and 16 is covered and closed by a breaker strip, A, sealing strip, trim strip, or the like comprising an elongate plate-like body 20 designed to seat in the offset portions of said flanges 12 and 16 in a generally flush relation, substantially as shown in Figs. 1 and 2. Such a breaker strip 20 or other finishing object preferably is provided in a relatively simple design in the form of an elongate plate-like article made of molded plastic material, or composition or fibre board, or as a simple sheet metal stamping, casting, or the like. Such breaker strips or other finishing objects preferably are provided in this manner inasmuch as there are no projecting parts thereon subject to breakage and the same otherwise may be compactly packaged to reduce the cost of shipping and handling to a minimum. When prepared for installation in an assembly, the breaker strips or other finishing objects are provided with the required connecting means to which spring clip fastening devices may be attached for mounting the breaker strip in the installation by substantial snap fastening action, or by otherwise providing the desired interlock between the finishing object and the supporting structure. Such connecting means may be provided in any suitable form or design in the manner of a connecting rib, flange, block or stud, or the like, either as an integral portion on the underface of the breaker strip or as a separate element secured to the underside thereof in any suitable way as by adhesive, welding or other securing means to unite the same to the breaker strip in a concealed joint in which the securing means is not visible on the outer or exposed surface of the breaker strip or other finishing object.

In this relation, a further advantage is obtained by the present invention in that it is often necessary or desirable for a saving in material that the breaker strip, sealing strip or other finishing object be of comparatively thin cross-section and usually of insufficient thickness to conceal a metallic insert or threaded screw fastening. In the instant construction, the use of threaded fastenings is avoided and by employing the improved attaching clips in combination with the connecting means provided on the underside of the breaker strip, as aforesaid, the breaker strip or other finishing object may be provided in any selected decorative configuration and of relatively thin cross-section, and yet rigidly and securely mounted onto the supporting wall or other supporting structure and by completely concealed fastening means which do not mar or detract from the appearance of the breaker strip or other finishing object in mounted position.

In the present example, the breaker strip 20 is shown provided with such connecting means in the form of a block or rib 22 which is angularly undercut to define angularly inclined abutments 23. The block 22 may be of the same material as the breaker strip or of any other suitable material and is secured to the breaker strip by a cement or adhesive 24 or other equivalent means such as welding, or the like. The block or rib 22 may be provided either in separate sections or as a continuous piece along the length of the breaker strip, but in any case said block or rib provides means for the attachment thereto of the required spring clips 30 adapted for snap fastening engagement with the flanges 12, 16 of the wall members 11, 15, respectively.

The attaching clip 30 is an inexpensive article of manufacture which may be readily provided from any suitable sheet metal or wire material preferably spring metal or cold rolled metal having spring characteristics. A suitable sheet metal blank of predetermined size is bent to provide a central base portion 31 which preferably is formed with an arch or bow for added resiliency. Along opposite sides of said base, integral spaced projections defining spaced attaching and holding tabs 33 are bent downwardly in inwardly inclined relation to each other at an angle approximating the inclination of the abutments 23 on the connecting block or rib 22. The tabs 33 thus define substantial cleats adapted to provide a rigid non-rotatable attachment of the base 31 of the clip fastener to the connecting block or rib 22. Preferably said cleats 33 are formed with slight longitudinal corrugations defining rounded cam surfaces 34, Figs. 4 and 5, on the inner faces thereof to facilitate the sliding of said cleats into attached relation with said connecting block or rib.

Spring arms 35 are provided from integral extensions on said fastener base 31 between the tabs 33 and are bent generally upwardly from said base in opposite relation to said tabs 33. In the present example, the space between the panel flanges 12, 16, is relatively wide and accordingly, the spring arms 35 are provided in the form of relatively large return bends which define oppositely inclined guide surfaces 36 leading to shoulders 37 for engaging the edges of said panel flanges 12, 16, and adjacent lips 38 on the extremities of said spring arms for seating on marginal edge portions of said flanges 12, 16. The clip may be designed for use with only one spring arm 25, if desired, and of course the fastener may be provided in various modified forms comprising two or more similar spring arms on either side of the fastener base.

With the various parts of the assembly thus provided, it will be understood that as many such clips 30 as are necessary are attached to the connecting block or rib 22 along the path which the breaker strip 20 extends in mounted position on the flanges 12, 16. The attachment of a clip fastener to the connecting block 22 is effected by positioning the tabs or cleats 33 over the end of the connecting block on either side thereof and sliding the fastener as necessary for said cleats 33 to engage and grip the inclined abutments 23 on the block as shown in Fig. 1. The arrangement is such that the rounded cam surfaces 34 on the inner faces of said cleats 33 facilitate such sliding of the fasteners to their attached locations on the breaker strip and otherwise effect a firm, positive gripping action with the abutments 23 on said connecting block or rib 22 to provide a fixed and rigid attachment of the clips to the breaker strip.

With the required clip fasteners 30 thus attached to the breaker strip, the mounting of the breaker strip on the flanges 12, 16, is effected simply by positioning the spring arms 35 of the clips in the space between the edges of said flanges. The inclined guide surfaces 36 of the spring arms bear upon said edges of the flanges 12, 16, and as pressure is exerted on the outer surface of the breaker strip 20, said spring arms are compressed toward each other as necessary for the retaining shoulders 37 on said spring arms to snap into engagement with the edges of said flanges 12, 16. In this relation, the shoulders 37 are supported in engagement with the flanges 12, 16, by the lips 38 seated on the adjacent marginal portions of said flanges and the body portions of the breaker strip in bearing engagement with said flanges, substantially as shown in Figs. 1 and 2.

The spring arms 35 are designed to engage the edges of the flanges 12, 16, under compression and preferably the shoulders 37 thereon are tapered slightly to define substantial cam surfaces which exert an axial drawing action on the connecting block or rib 22 to pull the breaker strip into close flush engagement with the engaged surfaces of the flanges 12, 16, in providing a mounting in which the fastening means is under continuously effective spring holding action at all times. The shoulders 37 may be provided in any other suitable manner in the form of lug, teeth, or abutment means to positively engage the flange edges 12, 16, depending on the size and thickness thereof. Preferably such shoulders are provided in the form of tapered cam surfaces, as aforesaid, which not only permits the use of certain size clips with supporting flanges of different thicknesses, but also insures a positive, self-seating of the breaker strip in applied mounted position by reason of the expansive force of the spring arms 35 in causing such cam shoulders 37 to ride on the corner edges of the flanges 12, 16, to the point of most effective fastening engagement therewith and thereby provide a rigid, positive mounting of the breaker strip despite manufacturing variations or irregularities in the thickness of said flanges.

Figs. 6–8 inclusive disclose another form of the invention in which a breaker strip B of the character shown in Fig. 6 is mounted over the space between the inner and outer liners or wall panels 40, 41, of a wall structure, or the like, which is generally similar to that described with reference to Figs. 1–5 inclusive except that the inner flanges comprise end portions 42, 43, extending inwardly in generally parallel and spaced relation to said inner and outer liners or wall panels 40, 41. The breaker strip B likewise comprises an elongate relatively thin body 45 and a connecting block or rib 46 provided with connecting studs 47 in the locations where the clip fasteners are to be attached thereto. The breaker strip or other object is shown as one provided of molded plastic material but of course such an article may be made of any other suitable material. The connecting block 46 may be of the same material as the breaker strip 45 or of any other suitable material and is secured to the underside of the breaker strip body 45 by cement or adhesive 48 or other suitable means such as welding, or the like. The block or rib 46 may be provided either in separate sections or as a continuous piece along the length of the breaker strip, but in any case a suitable number of the connecting studs 47 are provided for the attachment thereto of the required spring clips 50 which are designed for snap fastening engagement with the end portions of the flanges 42, 43.

The attaching clip 50 in this form of the invention comprises a central base portion 51 which preferably is formed with a slight arch or bow for added resiliency. Along opposite sides of said base portion 51, spaced projections defining spaced attaching and holding tabs 53 are bent downwardly as required for engaging the sides of the connecting block 46. The tabs 53, accordingly, define substantial cleats which provide for a rigid, nonrotatable attachment of the base 51 of the clip fastener to the connecting block or rib 46. Spring arms 55 are provided from integral extensions on said fastener base 51 between the tabs 53 and are bent generally upwardly from said fastener base in opposed relation to said tabs 53. The spring arms 55 comprise inclined guide surfaces 56 on their extremities leading to inwardly offset shoulders 57 designed for positive snap fastening engagement with the edges of the flanges 42, 43. Such a clip fastener may be provided having only one such spring arm 55, if desired, and of course, related types of fasteners may be readily designed in various modified forms having two or more similar spring arms on either side of the fastener base 51. In the approximate mid-portion of the generally arched fastener base 51, resilient stud engaging elements 59 are provided in the manner of cooperating biting tongues adapted to engage the connecting stud 47 to retain the fastener base attached to the connecting stud in cooperation with the tabs 53 which engage the adjacent sides of the connecting block 46 to prevent relative rotation of the clip fastener from any such attached position. The stud engaging elements 59 are preferably formed in the manner of cooperating yieldable tongues having spaced notched extremities on either side of a passage for the stud. Such tongue elements 59, accordingly, are adapted to function substantially in the manner of a clutch to pass the connecting stud in the direction toward attachment of the fastener base to the stud and to prevent reverse movement of the fastener base in the direction toward separation and removal of the fastener from its finally applied attached position on the breaker strip. The breaker strip B as thus provided with the required attaching clips 50 is easily and quickly mounted over the space between the flanges 42, 43 of the wall panels simply by positioning the inclined guide surfaces 56 on the free ends of the spring arms 55 of a clip in the space between the edges of said flanges 42, 43. The guide surfaces 56 of the spring arms bear upon said edges of the flanges and as pressure is exerted on the outer surface of the breaker strip body 45 said spring arms are compressed toward each other as necessary to permit the retaining shoulders 57 on said spring arms to snap into fastening engagement with the edges of said flanges 42, 43, substantially as shown in Fig. 6, to provide a completed mounting of the breaker strip in the manner and for the purposes described with reference to the form of invention disclosed in Figs. 1-5 inclusive.

Figs. 9, 10 and 11 illustrate a further form of invention in which a breaker strip C or other finishing object is mounted on a refrigerator wall construction or the like in a manner similar to that described with reference to Figs. 1-5 inclusive but in which the connecting means comprises an integral connecting block or rib formed directly in the body of the breaker strip for attaching the clip fasteners thereto rather than by a separate connecting block or rib cemented or otherwise secured to the breaker strip for this purpose. The wall construction comprises an outer panel or liner 60 having an inturned flange 62 and inner wall or structural member 61 having a relatively wide flange 63 formed with a corrugation 64 defining a seat for one side of the breaker strip C.

The breaker strip C comprises an elongate relatively thin body 65 made of plastic or other suitable material, as aforesaid, and is provided with an integral connecting block or rib portion 66 which is defined by longitudinal slots or grooves 67 extending into said body of the breaker strip in inwardly inclined angular relation. The angular slots 67 form undercut abutments 68 for the attachment of the required clip fasteners 70, which provide a snap fastening mounting of the breaker strip on the end portions of the flanges 62, 63. The spring clips 70 are somewhat similar to those described with reference to Figs. 1-5, inclusive, in comprising a central base portion 71 which is generally arched or bowed to increase the resiliency thereof and is provided with a suitable tool-receiving recess 72 for receiving a tool which is used to facilitate the application of the clips to attached position on the breaker strip. On opposite sides of the fastener base 71, integral spaced projections defining spaced attaching and holding tabs 73, are bent downwardly in inwardly inclined relation to each other at an angle approximating the inclination of the abutments 68 formed by the slots or grooves 67 in the body of the breaker strip, as aforesaid. The tabs 73, accordingly, define substantial cleats which provide a rigid, nonrotatable attachment of the fastener base 71 to the connecting block or rib portion 66 of the breaker strip.

Integral extensions on said fastener base 71 between the tabs 73 provide arms 75, 76, which are bent generally upwardly from said fastener base in opposite relation to the tabs 73. The arm 75 is provided in the form of a short relatively rigid shoulder adapted for an interlocking, positive clasping relation with the inturned flange 63 of the inner structural member 61. The cooperating arm 76 is a spring arm designed for considerably greater resiliency and is provided in the form of a relatively large return bend having a rounded cam or guide surface 77 leading to a shoulder 78 for engaging the edge of the flange 62 on the outer wall panel or liner 60, together with an adjacent lip portion 79 for seating on the marginal portion of said flange 62 in the applied fastening position of the clip, substantially as shown in Fig. 9.

With the breaker strip C and the clip fasteners 70 thus provided, as many of such clips as are necessary are attached to the connecting block or rib 66 on the breaker strip along the path which the breaker strip extends in mounted position on the flanges 62, 63. The attachment of a clip fastener 70 to the connecting block 66 of the breaker strip in this form of the invention is easily and quickly effected by positioning the downwardly bent tabs or cleats 73 over the end of the connecting block 66 and sliding the fastener as necessary for said cleats to engage the inclined abutments 68 on the breaker strip, whereupon the clips are pushed longitudinally relatively to the breaker strip to the desired location thereon. The attachment of the clips in this manner is facilitated by the use of a pointed tool applied to the tool-receiving recess 72 in the fastener base to compress the fastener base from its generally arched or bowed formation, thus spreading the tabs 73 apart as necessary to permit quick and easy sliding of the clip to attached position on the breaker strip. When the tool is removed, the fastener base tends to assume its initial bowed or arched formation and thereby draws the tabs 73 inwardly toward each other into rigid and positive engagement with the abutments 68 so that the clip fastener is held in rigidly attached position on the breaker strip under spring tension.

With the required clip fasteners thus attached to the connecting block 66, the mounting of the breaker strip on the flanges 62, 63 is effected by moving the breaker strip laterally as necessary to engage the clasping arm 75 of each clip with the underside of the inturned flange 63 of the inner wall member, substantially was shown in Fig. 9. In this position, the rounded guide surface 77 on the resilient spring arm 76 is in position to cam against the end of the flange 62, and as pressure is exerted on the breaker strip, said spring arm 76 is compressed as necessary for the retaining shoulder 78 thereon to snap into engagement with the edge of said inturned flange 62. In this relation, said shoulder 78 is supported in engagement with the flange 62 by the lip 79 bearing on the adjacent marginal portion of said flange 62 and by the side body portions of the breaker strip C in bearing engagement with the adjacent surfaces of said flanges 62, 63.

Figs. 12–15 inclusive disclose another form of the invention in which the breaker strip D is provided with a connecting block or rib in a manner similar to the form of invention described with reference to Figs. 1–5, inclusive, but in which the clip fasteners are provided in an improved design comprising only a single spring arm adapted to provide the desired mounting of the breaker strip in the completed installation. The wall structure comprises a panel 80 having an inturned flange 81 and an associated panel 82 spaced therefrom and having a flange 83 provided with openings in which rubber grommets 84 are secured. The flanges 81, 83, are connected by an inner spacer member 85 which is secured to the panel flange 81 by bolts or screws 86 threaded into nut elements 87, while the flange 83 is secured to said spacer member 85 by screws 88 extending through the grommets 84 and threaded into nut elements 89 provided on outwardly bent integral wings 90 stamped from said spacer member 85. The inner end of said wing 90, accordingly, defines a flange edge 92 in spaced relation to the flange edge 93 on the inner end of the inturned flange 81 and these portions 92, 93, thus define the spaced flanges of the cooperating wall panels or liners in the wall structure thus provided.

The breaker strip D comprises a relatively thin body 95 having a longitudinal connecting block or rib 96 which is angularly undercut to define the abutments 97 on the sides thereof and is secured to the breaker strip body 95 by cement or adhesive 98 or other suitable means such as welding, or the like. The attaching clip 100 comprises a sheet metal body bent to define a base 101 which preferably is formed with an arch or bow for added resiliency. Integral projections on opposite sides of said fastener base are bent downwardly to define spaced attaching and holding tabs 103 extending inwardly in inclined relation toward each other at an angle approximating the inclination of the abutments 97 on the connecting block or rib 96. The tabs 103, accordingly, define substantial cleats which provide a rigid nonrotatable attachment of the fastener base to the connecting block or rib 96. Preferably said tabs are formed at one end with outwardly flared extremities 104, Figs. 13 and 14, which facilitate the initial application of the tabs 103 over the end of the connecting block and the sliding of the fasteners to the desired attached location on the breaker strip. A portion of the fastener base 101 includes an extension which is bent upwardly from the fastener base to provide a return bent spring arm 105 extending in opposed relation to the tabs 103. The return bent spring arm 105 is suitably formed to provide a resilient shoulder 106 on the portion thereof depending from the fastener base and a cooperating shoulder 107 on the extremity thereof while the intermediate rounded portions of the spring arm define cam-like guide surfaces 108. Preferably the spring arm is provided with a corrugation 109 adjoining the fastener base which strengthens and rigidifies said spring arm in the completed clip structure.

The clip fastener 100 thus provided is attached to the connecting block or rib 96 on the breaker strip in substantially the manner described with reference to Figs. 1–5 inclusive by sliding the holding tabs 103 over the end of the connecting block and advancing the clip to its attached location on the breaker strip. With the required clip fasteners 100 thus attached to the breaker strip, the mounting of the breaker strip on the flanges of the wall structure is effected easily and quickly by positioning the spring arm 105 in the space between the flange edges 92, 93. The guide surfaces 108 defined by the rounded cam-like formation of the spring arm bear upon said flange edges 92, 93, and as pressure is exerted on the outer surface of the breaker strip D, said guide surfaces cause the spring arm to be compressed as necessary for the shoulder 106 to snap into engagement with the flange edge 93 while the shoulder 107 on the extremity of the spring arm seats in bearing engagement with the flange edge 92. In this relation, the shoulders 106, 107, are disposed in resilient engagement with the flange edges 92, 93, under continuously effective spring tension set up in the spring arm as compressed in the applied mounted position of the breaker strip.

A divisional application Serial Number 253,893, filed October 30, 1951, is directed, more particularly, to the forms of the invention shown in Figs. 9–15, inclusive.

Although the various embodiments of the invention are described in connection with an insulated wall construction which is particularly useful in refrigerators and similar structures, it is to be understood that the invention is equally adaptable to various other similar applications and uses in building constructions and the like within the general scope and teachings of the instant disclosure.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices used in installations where extreme vibratory motion takes place. A cheap but effective fastener may also be provided from cold rolled metal, such as cold rolled steel, which is untempered but of a spring metal nature and capable of providing an effective and reliable fastening means.

While the invention has been described in detail with specific examples, such examples are intended as illustrations only, inasmuch as it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A fastener for a structure comprising spaced flanges and an object to be secured over said spaced flanges and having a connecting portion on its underside, said fastener comprising a piece of sheet metal providing a base and portions at opposite ends of said base each comprising a pair of spaced tabs and a spring arm between said pair of spaced tabs of greater length than said pair of spaced tabs, said spaced tabs projecting outwardly from one side of said fastener base for engaging said connecting portion on said object, and said spring arms projecting outwardly from the opposite side of said fastener base for engaging said spaced flanges to secure said object over said spaced flanges.

2. A fastener for a structure comprising spaced flanges and an object to be secured over said spaced flanges and having a connecting portion on its underside, said fastener comprising a piece of sheet metal providing a base and portions at opposite ends of said base each comprising a pair of spaced tabs and a spring arm between said pair of spaced tabs of greater length than said pair of spaced tabs, said spaced tabs projecting outwardly from one side of said fastener base for engaging said connecting portion on said object, and said spring arms projecting outwardly from the opposite side of said fastener base and having return bent portions provided with shoulders for engaging said spaced flanges to secure said object over said spaced flanges.

3. A fastener for a structure comprising spaced flanges and an object to be secured over said spaced flanges and having a connecting block on its underside, said fastener comprising a piece of sheet metal providing a base and portions at opposite ends of said base each comprising a pair of spaced tabs and a spring arm between said pair of spaced tabs of greater length than said pair of spaced tabs, said spaced tabs projecting outwardly from one side of said fastener base for engaging said connecting block on said object, and said spring arms projecting outwardly from the opposite side of said fastener base, said spring arms comprising return bent portions defining cam surfaces and shoulders adjacent said cam surfaces adapted for snap fastening engagement with said spaced flanges to secure said object over said spaced flanges.

GEORGE A. TINNERMAN.

REFERENCES CITED

The following references are of record in the file of this patent:

UNITED STATES PATENTS

| Number | Name | Date |
| --- | --- | --- |
| 2,208,722 | Doty | July 23, 1940 |
| 2,208,727 | Marshall | July 23, 1940 |
| 2,259,186 | Swedman | Oct. 14, 1941 |
| 2,267,379 | Tinnerman | Dec. 23, 1941 |
| 2,277,838 | Baker | Mar. 31, 1942 |
| 2,322,656 | Murphy | June 22, 1943 |
| 2,330,988 | Nave | Oct. 5, 1943 |
| 2,353,455 | Gisondi | July 11, 1944 |
| 2,414,986 | Tinnerman | Jan. 28, 1947 |
| 2,417,922 | Frazer | Mar. 25, 1947 |
| 2,467,604 | Tinnerman et al. | Apr. 19, 1949 |